(12) United States Patent
Yoon et al.

(10) Patent No.: US 10,005,260 B2
(45) Date of Patent: Jun. 26, 2018

(54) OPTICALLY TRANSMISSIVE ANTIMICROBIAL GLASS WITH SHIELDING EFFECT FOR ELECTROMAGNETIC WAVE

(71) Applicant: The Industry & Academic Cooperation in Chungnam National University (IAC), Daejeon (KR)

(72) Inventors: Soon-Gil Yoon, Daejeon (KR); Hyung-Jin Choi, Seoul (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 359 days.

(21) Appl. No.: 14/854,315

(22) Filed: Sep. 15, 2015

(65) Prior Publication Data
US 2016/0368245 A1  Dec. 22, 2016

(30) Foreign Application Priority Data

Jun. 19, 2015  (KR) ........................ 10-2015-0087578

(51) Int. Cl.
| | |
|---|---|
| *B32B 17/06* | (2006.01) |
| *G02B 1/16* | (2015.01) |
| *C03C 17/36* | (2006.01) |
| *G02B 1/18* | (2015.01) |
| *C03C 23/00* | (2006.01) |
| *B32B 17/10* | (2006.01) |

(52) U.S. Cl.
CPC ............ *B32B 17/061* (2013.01); *B32B 17/06* (2013.01); *B32B 17/1099* (2013.01); *C03C 17/361* (2013.01); *C03C 17/3639* (2013.01); *C03C 17/3644* (2013.01); *C03C 23/007* (2013.01); *G02B 1/16* (2015.01); *G02B 1/18* (2015.01); *B32B 2307/412* (2013.01); *B32B 2307/754* (2013.01)

(58) Field of Classification Search
CPC .... C03C 17/3644; B32B 17/061; B32B 17/06
See application file for complete search history.

(56) References Cited

U.S. PATENT DOCUMENTS

| | | | | |
|---|---|---|---|---|
| 5,419,969 A | * | 5/1995 | Miyazaki | ................ C03C 17/36 |
| | | | | 359/350 |
| 2003/0064179 A1 | * | 4/2003 | Kijima | .................. C03C 17/008 |
| | | | | 428/34.4 |
| 2008/0118762 A1 | * | 5/2008 | Morimoto | ................ H01J 11/44 |
| | | | | 428/457 |
| 2014/0227456 A1 | * | 8/2014 | Kinoshita | ............. C01B 33/113 |
| | | | | 427/553 |

OTHER PUBLICATIONS

Choi, Hyung-Jin et al., "Electromagnetic shielding and antibacterial effect using Al doped ZnO thin films by Facial Target Sputtering", The 8th Korea-Vietnam International Joint Symposium on Advanced Materials, Daejeon, Korea, Jun. 4-5, 2015, 2 pages.
2014 Fall Meeting of The Korean Ceramic Society, 2 pages.
The 31st International Korea-Japan Seminar on Ceramics, Nov. 26-29, 2014, Changwon Exhibition Convention Center, Korea, Program Guide (2 pages).
2015 Spring Meeting of The Korean Ceramic Society, 2 pages.

* cited by examiner

*Primary Examiner* — Prashant J Khatri
(74) *Attorney, Agent, or Firm* — Mintz Levin Cohn Ferris Glovsky and Popeo, P.C.; Kongsik Kim; Moonkyoung Um (57) ABSTRACT

The present invention relates to an antimicrobial glass having both electromagnetic shielding and antimicrobial characteristics while maintaining the transparency of glass, and more particularly to an optically transmissive antimicrobial glass with an electromagnetic shielding effect that includes an AZO/Ag/AZO multilayer thin film deposited on a glass substrate.

6 Claims, 14 Drawing Sheets

OPTICALLY TRANSMISSIVE ANTIMICROBIAL GLASS WITH SHIELDING EFFECT FOR ELECTROMAGNETIC WAVE

CROSS-REFERENCE TO RELATED APPLICATION

This application claims priority to Korean Application No.: 10-2015-0087578 filed Jun. 19, 2015, which is incorporated herein by reference.

TECHNICAL FIELD

The present invention relates to an antimicrobial glass that has both electromagnetic shielding and antimicrobial characteristics while maintaining the transparency of glass.

BACKGROUND ART

Glass is in widespread use for interior/exterior constructive materials largely due to its transparent and aesthetic characteristics but likely to break and vulnerable to fire. As toughened glass and fire-resistant glass are available to remedy the disadvantages of glass like breakableness and low resistance to fire, glass has more widespread usages in surface materials for electronic equipment such as mobile phones, home appliances such as refrigerators, air conditioners, etc., tableware, furniture, or the like. With the recent advent of electronic equipment integrated on a glass panel, clear electronic equipment has been widely used. Such glass materials are often exposed to perspiration, saliva, dust, grease, smoke, moisture, and so forth and thus liable to afford support for the propagation of germs, and the germs can spread to the hands that come into contact with the glass.

As a solution to this problem, there has been developed antimicrobial glass that has an antimicrobial function in addition to the features of regular glass. Particularly, the antimicrobial glass for use in a glass panel for electronic equipment is required to maintain high transparency and have an antimicrobial function, and mechanical durability is needed to the glass panel with an antimicrobial function.

Further, the electromagnetic radiation produced from the circuits mounted in all kinds of electronic equipment possibly causes malfunction of the equipment or electromagnetic interference, eventually with deterioration in the performance of the product and reduction of the product's life span. Furthermore, the heating effect of the electromagnetic radiation absorbed by the living cells of a human body can raise the temperature of the living tissue to weaken the immune function. Thus, there is an increasing demand for a glass product that satisfies the electromagnetic compatibility (EMC), which means that it not only emits the least of the electromagnetic radiation from the equipment to the outside to cause little interference to other peripheral equipment, but also gets less affected by the interference of the electromagnetic radiation produced by the peripheral equipment.

The most important features required to the EMC product inserted in all kinds of electronic equipment are high electromagnetic shielding effectiveness, high specific absorption rate (SAR), and slime and small-size profile in line with the trend for minimization to manufacture ever smaller and slimmer products.

In addition, there are a variety of electronic equipment or devices with touchscreen technologies that enable the user to operate the equipment or devices by touching the screen in consideration of the user's convenience. Using the touch screen with one or more fingers leaves fingerprints and smudges on the screen due to dirt and grease of the fingers, which has an adverse effect to spoil the aesthetic of the touch screen. Further, the touch screen can suffer from the problem of fingerprints on the display that the fingerprint oil residue can deteriorate the clarity of the fingerprints and results in poor definition of the display. Thus the user of the touch-screen electronic equipment often uses a fingerprint-resistant screen protector that attaches on the face of the equipment. The screen protector is easy to replace but poor in durability and inconvenient to use in that it is likely to be installed on the face of the equipment with air bubbles or imperfect alignment.

According to the prior art, it is necessary to provide separate functional layers on a glass panel for the sake of giving an antimicrobial function, an electromagnetic shielding effect, or an anti-fingerprint effect. This takes a long processing time and lowers the productivity, causing a rise of the production cost.

SUMMARY

For solving the problem with the prior art, it is an object of the present invention to provide an optically transmissive antimicrobial glass that displays both electromagnetic shielding and optical transmission characteristics.

It is another object of the present invention to provide an antimicrobial glass having an anti-fingerprint characteristic in addition to the above-mentioned functions of the antimicrobial glass.

To achieve the objects of the present invention, there is provided an optically transmissive antimicrobial glass having an electromagnetic shielding effect that includes an AZO/Ag/AZO multilayer thin film deposited on a glass substrate.

The AZO thin film is an aluminum-doped ZnO thin film. The AZO/Ag/AZO multilayer thin film of the present invention, which can be formed in-situ, displays good optical transmission characteristics to maintain the inherent transparency of glass and provides both antimicrobial and electromagnetic shielding characteristics without separately using an antimicrobial agent or an electromagnetic shielding agent.

The AZO single-layer thin film also has the antimicrobial characteristic equivalent to that of the AZO/Ag/AZO multilayer thin film, but its processing temperature needs to be above 250° C. in order to achieve such a low specific resistance as to realize an electromagnetic shielding effect equivalent to that of the multilayer thin film. Further, even if the AZO single-layer thin film is deposited at high temperature above 250° C., its thickness needs to be 250 nm or greater for the sake of providing a specific resistance of $10^{-3}$ $\Omega \cdot cm$ or less (related data not shown). According to a comparison group pretest, the specific resistance of the AZO thin film is $1.1 \times 10^{-3}$ $\Omega \cdot cm$ when the thickness is 200 nm and reduced to $8.9 \times 10^{-3}$ $\Omega \cdot cm$ when the thickness is 250 nm. But, the specific resistance has no significant decrease with an increase in the thickness of the AZO thin film and amounts to $7.0 \times 10^{-3}$ $\Omega \cdot cm$ at the thickness of 350 nm. The optical transmittance of the AZO thin film in the visible light range gradually decreases with an increase in the thickness of the AZO thin film. For example, the visible transmission of the thin film is 90% at thickness of 200 nm, 81% at 250 nm, and then gradually decreases as the thin film gets thicker. The electromagnetic shielding efficiency of the AZO thin film having a thickness of 250 nm amounts to 27 dB, which is lower than the electromagnetic shielding efficiency of the multilayer thin film of the present invention. Contrarily, the antimicrobial glass with the multilayer thin film of the present invention can achieve a good electromagnetic shielding effect even when the thickness of the thin film deposited at the room temperature is as thin as no more than several nanometers.

The thickness of the AZO thin film is preferably in the range of 20 to 60 nm. The AZO thin film extremely thin has deterioration in the electromagnetic shielding characteristic, and the AZO thin film extremely thick displays an abrupt decrease of the optical transmittance.

The thickness of the Ag layer is preferably in the range of 3 to 15 nm. The Ag layer extremely thin is hard to deposit uniformly, and the Ag layer extremely thick has an abrupt decrease of the optical transmittance.

The antimicrobial glass of the present invention has both antimicrobial and electromagnetic shielding characteristics and thus can be used as a surface material for electronic equipment such as mobile phones or home appliances. Preferably, the antimicrobial glass of the present invention is very usefully applied to the display panels integrated on a glass panel like monitor screens that come into a close contact with the human body in use, particularly touchscreen display panels that more frequently come into contact with the human body.

When the antimicrobial glass of the present invention is applied to the touchscreen display panels or used as a surface material for home appliances, it is necessary to offer an anti-fingerprint effect in order to prevent the risk of contamination by the touch of the user's fingers. The anti-fingerprint effect is to prevent the perspiration or flakes of the skin tissue moving from the fingers onto the surface of the display panels or the home appliances. For better anti-fingerprint effect, it is therefore required for the surface to have a larger angle of contact with the moving object, normally greater than 90°, which is given as a threshold. The maximum angle of contact is 180°, and setting its limit is of no significance.

In order to further provide the anti-fingerprint characteristic for the antimicrobial glass of the present invention, the antimicrobial glass may be subjected to a heat treatment in the oxygen atmosphere. The heat treatment may be performed at 80 to 150° C. As the extremely low temperature for the heat treatment results in an insufficient surface modification, the desirable temperature for the heat treatment is at least 80° C. But, the angle of contact rather decreases with an increase in the heat treatment temperature, and a high heat treatment temperature is undesirable even in the aspect of the efficiency of the process. According to a pretest, the angle of contact amounts to the maximum value when the heat treatment is carried out at 100° C., and the heat treatment temperature is preferably 150° or less in the aspect of the efficiency of the process. Using the oxygen atmosphere during the heat treatment implies the presence of oxygen but does not mean that there's no other gas than oxygen.

The heat treatment time may be appropriately controlled depending on the heat treatment temperature so that the angle of contact exceeds 90°. It is apparent that the heat treatment time becomes longer with the lower heat treatment temperature.

As demonstrated in a touch test for evaluation of durability, the antimicrobial glass of the present invention can display maintained or even slightly enhanced performances in regards to all the transparency and antimicrobial and anti-fingerprint characteristics, which implies high durability.

As described above, the antimicrobial glass of the present invention includes a thin film as thin as no more than several score or several hundred nanometers to realize lightweightness and achieve both electromagnetic shielding and antimicrobial effects without a great change in the optical transmittance. Further, the antimicrobial glass of the present invention has high durability against touches and is thus usefully applicable to any kind of electronic equipment using a glass panel, particularly to touchscreen display panels.

In addition, the antimicrobial glass of the present invention realizes an anti-fingerprint characteristic simply by adding a heat treatment process and is thus particularly applicable to touchscreen display panels to offer a clear image with high-definition quality on the display without any separate protection film.

DETAILED DESCRIPTION

Reference will now be made in detail to embodiments of the present disclosure, examples of which are illustrated in the accompanying drawings. While the present disclosure will be described in conjunction with the following embodiments, it will be understood that they are not intended to limit the present disclosure to these embodiments alone. On the contrary, the present disclosure is intended to cover alternatives, modifications, and equivalents which may be included within the spirit and scope of the present disclosure as defined by the appended claims.

EXAMPLES

Example 1: Preparation of Glass Substrate with AZO/Ag/AZO Multilayer Thin Film

A toughened glass substrate (5 cm×10 cm×70 μm, Corning Gorilla) is washed out and removed of foreign substances from the surface using the $N_2$ gas. Then, an AZO thin film is deposited at the room temperature according to the RF sputtering method. In the deposition process, the AZO target (2 inches in diameter) is a ZnO target doped with 2 wt. % of Al and then sintered at 1,500° C. using the ceramic process (purity: 99.99%). The deposition process is carried out by applying the RF power of 100 W to the target, with the working pressure of 0.13 Pa, the deposition rate of about 1 nm/min and the Ar gas of 10 sccm (standard cc/min) used as a sputtering gas. The thickness of the AZO thin film is controlled by the deposition time.

On the AZO thin film is in-situ deposited an Ag thin film as thick as 9 nm at the room temperature according to the DC sputtering method. In the deposition process, the target is an Ag target (purity: 99.99%) having a diameter of 2 inches. The deposition process is carried out by applying the DC power of 20 W to the target, with the working pressure of 0.39 Pa, the deposition rate of about 15 nm/min and the Ar gas of 10 sccm (standard cc/min) used as a sputtering gas.

Finally, an AZO thin film is deposited on the Ag thin film in the same manner and under the same conditions as described above in the formation of the AZO thin film to complete an AZO/Ag/AZO multilayer thin film.

Example 2: Comparison of Optical/Electrical Characteristics of AZO/Ag/AZO Multilayer Thin Film Depending on Thickness of AZO Thin Film The glass substrate with the multilayer thin film as prepared in Example 1 is measured in regards to the optical transmittance with an HP 8453 UV-VIS spectrophotometer. The measurement results are presented in FIG. 1A.

In a pretest for the AZO/Ag/AZO multilayer thin film formed on the toughened glass substrate, the Ag layer formed on the AZO thin film has a non-continuous structure when it is less than 9 nm in thickness, and is continuously deposited when it has a thickness of 9 nm or greater. Accordingly, the optical transmittance gradually increases with an increase in the thickness of the Ag layer from 3 nm to 9 nm, but gradually decreases at the thickness of the Ag layer exceeding 9 nm, and abruptly reduces at the thickness of the Ag layer greater than 15 nm. Thus, the thickness of the Ag layer is fixed at 9 nm.

Figure 1A:
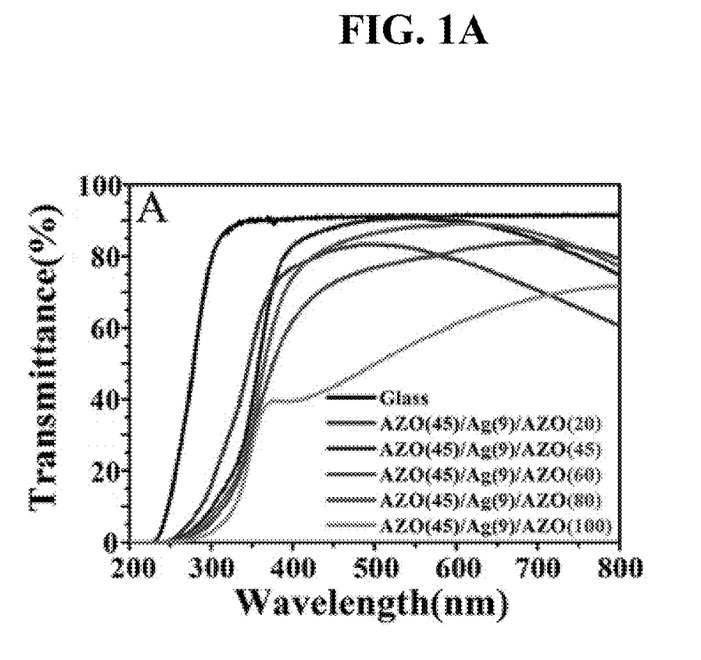
FIGS. 1A and 1B present graphs showing the optical and electrical characteristics of an AZO/Ag/AZO thin film.

FIG. 1A is a graph showing the optical transmittance of the AZO/Ag/AZO/Glass as a function of the thickness of the uppermost AZO thin film when the lower AZO thin film is deposited as thick as 45 nm, with the Ag layer 9 nm thick and the upper AZO thin film in a variable thickness of 20, 45, 60, 80, or 100 nm. As can be seen from the graph of FIG. 1A, the optical transmittance increases with an increase in the thickness of the AZO thin film starting from 20 nm, reaches to the maximum at the thickness of 45 nm, and gradually reduces with an additional increase in the thickness of the AZO thin film.

Figure 1B:
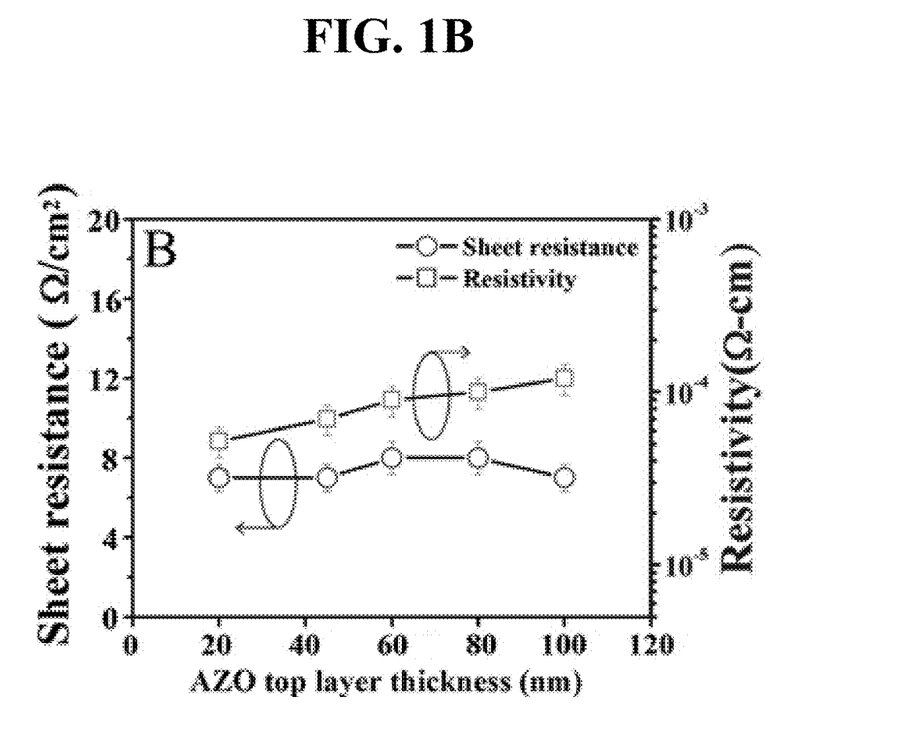

FIG. 1B is a graph showing the specific resistance calculated from the sheet resistance of the multilayer thin film as measured by the four-point probe method. The sheet resistance entirely shows the similar behavior due to the rise of the electrical conductivity caused by the intermediate Ag layer. The specific resistance of the multilayer thin film is less than $10^{-4}$ Ω·cm, which is almost equivalent to the specific resistance of a metal, when the upper AZO layer is less than 60 nm in thickness.

Figure 2A:
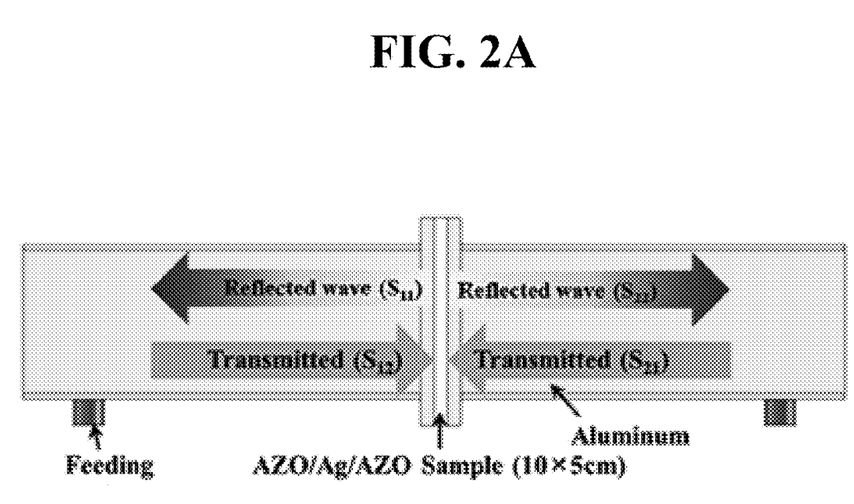
FIGS. 2A, 2B, 2C and 3 are graphs showing the electromagnetic shielding characteristic of the AZO/Ag/AZO thin film.

Example 3: Evaluation of Electromagnetic Shielding Characteristic for Glass Substrate with AZO/Ag/AZO Multilayer Thin Film The glass substrate with the multilayer thin film as prepared in Example 1 is measured in regards to the electromagnetic shielding characteristic in the wavelength range of 1.5 to 3 GHz with an HP Agilent E8363A according to the two-port method. FIG. 2A is a mimetic diagram of an electromagnetic shielding waveguide.

Figure 2B:
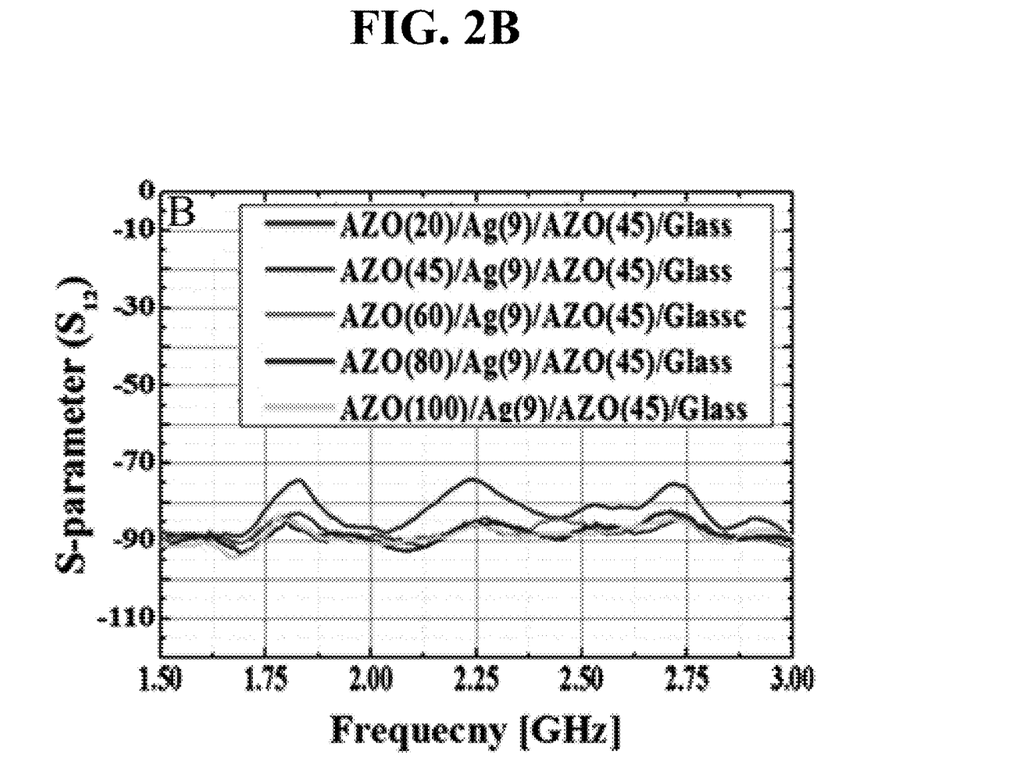
Figure 2C:
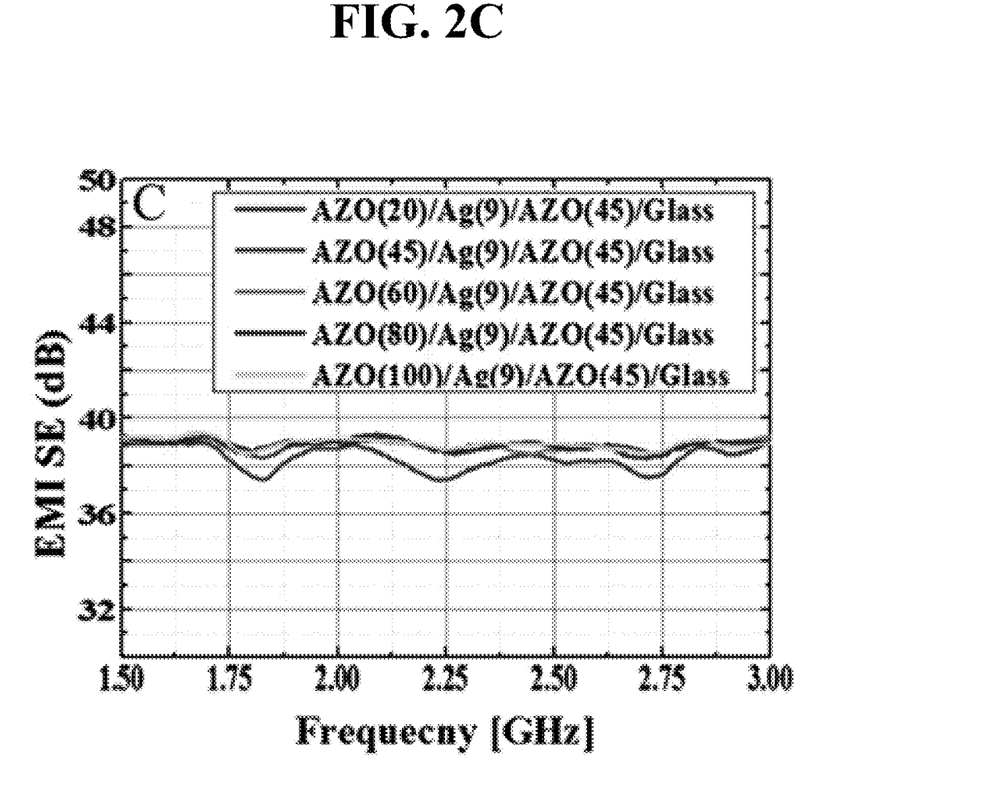
Figure 3:
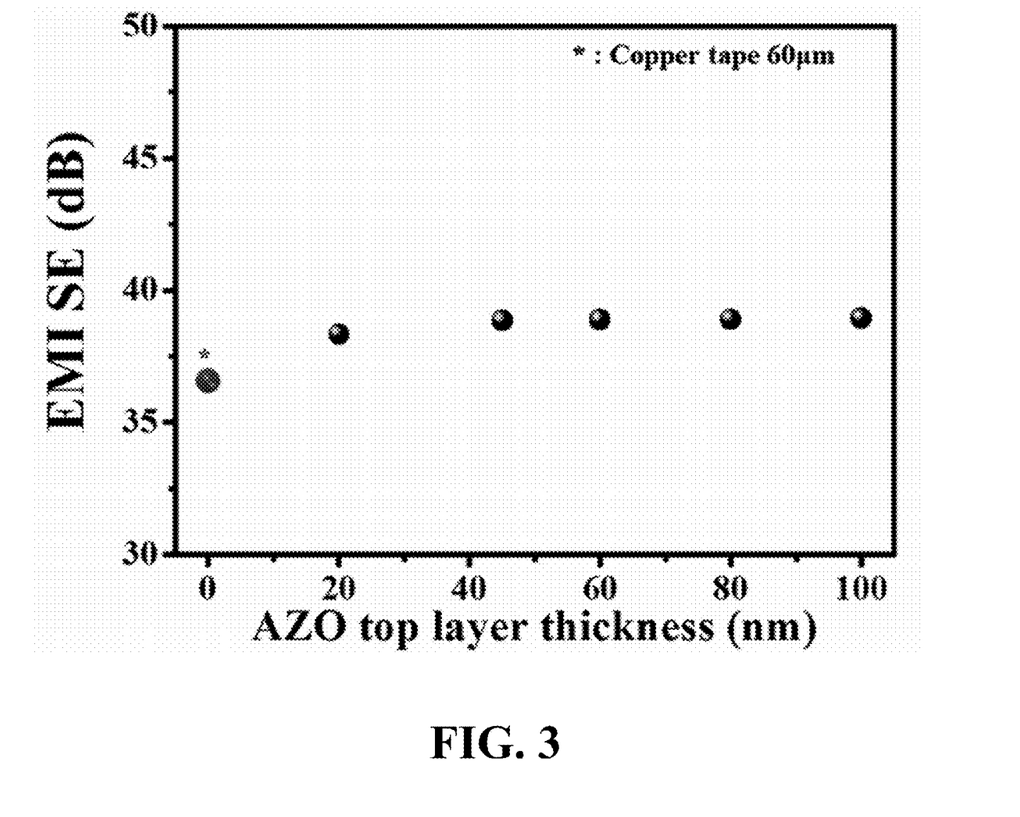

For a comparison of the electromagnetic shielding characteristic, a Cu film having a thickness of 60 μm is measured in regards to the electromagnetic shielding characteristic under the same conditions. The measurement, $S_{12}$ value is used to determine the electromagnetic shielding effectiveness according to the following equation. The calculation results are presented in FIGS. 2B, 2C and 3. In FIG. 3, the red dots denote the calculated values of the electromagnetic shielding effectiveness for the Cu film 60 μm thick that is a control.

$$EMI\ SE = 10\log\frac{1}{|S_{12}|^2} = 10\log\frac{1}{|S_{21}|^2}$$

Electromagnetic radiation is mitigated through reflection, absorption, or multiple reflection. Among these, the multiple reflection is almost ignorable as a contributor to the EMI shielding effect, and the mitigation of the electromagnetic radiation by absorption takes up 75% of the EMI shielding effect. In the case that the EMI shielding effectiveness through the absorption of the electromagnetic radiation is 10 dB or higher, it is considered that most of the electromagnetic radiation is absorbed. The EMI shielding effectiveness of 20 dB or higher means that there appears no interference caused by the electromagnetic radiation between the ports. As can be seen from FIG. 3, the AZO/Ag/AZO multilayer thin film displays the electromagnetic shielding effectiveness of about 38 dB when the upper AZO layer is 20 nm or greater in thickness. This shows that the AZO/Ag/AZO multilayer thin film is superior in the electromagnetic shielding effect to the Cu film.

Example 4: Evaluation of Antimicrobial Characteristic of Glass Substrate with AZO/Ag/AZO Multilayer Thin Film A toughened glass substrate (4.5 cm×4.5 cm×200 μm, Corning Gorilla) is washed out and removed of foreign substances from the surface using the $N_2$ gas. Then, an AZO(45 nm)/Ag(9 nm)/AZO(45 nm) multilayer thin film is deposited on the glass substrate under the same conditions as described in Example 1 and then evaluated in regards to the antimicrobial characteristic.

The antimicrobial characteristic is evaluated using *Staphylococcus Aureus* (American Type Culture Collection No. 6538) that is gram-positive bacterium and *Escherichia Coli* (American Type Culture Collection No. 8739) that is gram-negative bacterium, according to the thin film contact method (Testing & Research Institute. Antimicrobial Products-Test for antimicrobial and activity and efficacy, JIS Z 2801:2010), which project is performed by FITI Testing & Research Institute (Korea) by commission. The evaluation results are presented in FIG. 4 and Table 1. The same antimicrobial test procedures are performed on the controls, which are a bare glass substrate without a coating and a glass substrate with the AZO thin film (45 nm). As for the test conditions, the bacteria surviving a 24-hour cultivation at RH 90% and 35±1° C. are counted to determine the number of colonies according to the JIS (Japanese Industrial Standard) Z 2801 method.

Figure 4:
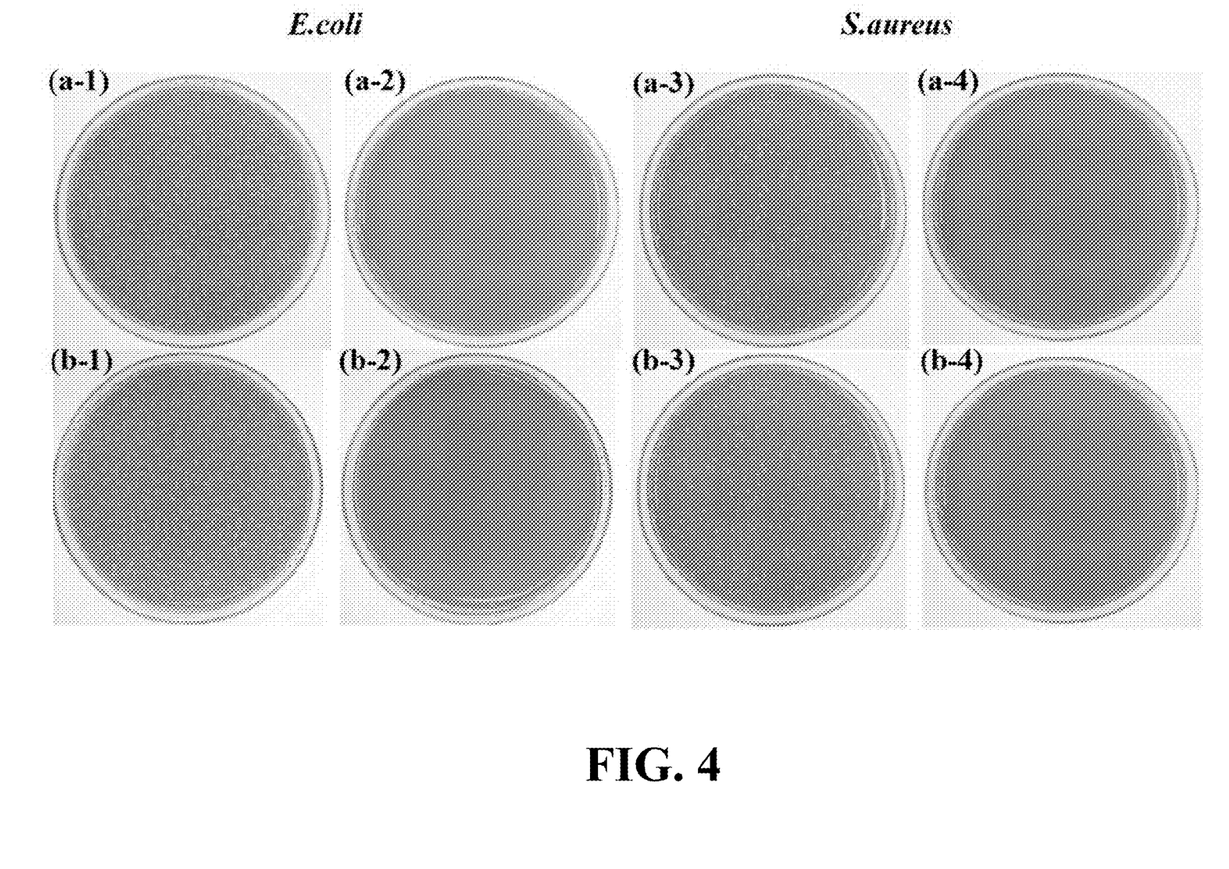
FIG. 4 presents images showing the antimicrobial characteristic of the AZO/Ag/AZO thin film.

FIG. 4 presents images after 24-hour cultivation of *S. aureus* and *E. Coli* bacteria, where FIGS. 4(*a*-1) and 4(*a*-3) show the test results for a bare glass substrate without a coating; and FIGS. 4(*a*-2) and 4(*a*-4) show the test results for the glass substrate with the AZO/Ag/AZO multilayer thin film. As can be seen from FIG. 4, the bare glass substrate has colonies of *S. aureus* and *E. Coli* bacteria, but the glass substrate with the AZO/Ag/AZO multilayer thin film has no colony of the bacteria, which demonstrates the antimicrobial characteristic. The glass substrates of FIGS. 4(b-2) and 4(b-4) with an AZO thin film alone have no bacteria, while the bare glass substrates of FIGS. 4(b-1) and 4(b-3) have colonies of bacteria observed.

FIGS. 4(b-2) and 4(b-4) and FIGS. 4(b-1) and 4(b-3) show the actual images of S. aureus and E. Coli bacteria cultured on bare glasses and an AZO/Ag/AZO species, respectively. As can be seen from FIGS. 4(b-1) and 4(b-3), there are no bacteria observed after cultivation. In addition, no bacteria are observed on the single thin film of AZO having a thickness of 45 nm. More specifically, Table 1 presents the measurement results of the antimicrobial activity, where the AZO/Ag/AZO/glass and the AZO/glass display the E. Coli declination of 99.99668% and the S. aureus declination of 9.99999% with respect to the control, that is, the bare glass.

TABLE 1

| Sample | Bacteria | Case | Start (cells/cm$^2$) | After 24 h (cells/cm$^2$) | Reduction of Bacteria (%) |
|---|---|---|---|---|---|
| AZO/Ag/AZO (45/9/45 nm) | E. coli | Blank | $1.3 \times 10^4$ | $1.3 \times 10^6$ | — |
| | | Coating film | $1.3 \times 10^4$ | <0.63 | 99.99999 |
| | S. aureus | Blank | $1.4 \times 10^4$ | $1.9 \times 10^4$ | — |
| | | Coating film | $1.4 \times 10^4$ | <0.63 | 99.99668 |
| AZO 45 nm | E. coli | Blank | $1.3 \times 10^4$ | $1.4 \times 10^6$ | — |
| | | Coating film | $1.3 \times 10^4$ | <0.63 | 99.99999 |
| | S. aureus | Blank | $1.3 \times 10^4$ | $1.9 \times 10^4$ | — |
| | | Coating film | $1.3 \times 10^4$ | <0.63 | 99.99668 |

Example 5: Establishing Anti-Fingerprint Characteristic by Heat Treatment

The glass sample with the AZO/Ag/AZO multilayer thin film prepared in Example 4 is subjected to a heat treatment using a rapid thermal annealing system. The initial vacuum is maintained at 1.0 pa or below, and the $O_2$ gas is fed into the chamber to maintain the working pressure at the atmospheric pressure. Under these conditions, the heat treatment is carried out for 100 seconds to 20 minutes.

Figure 5:
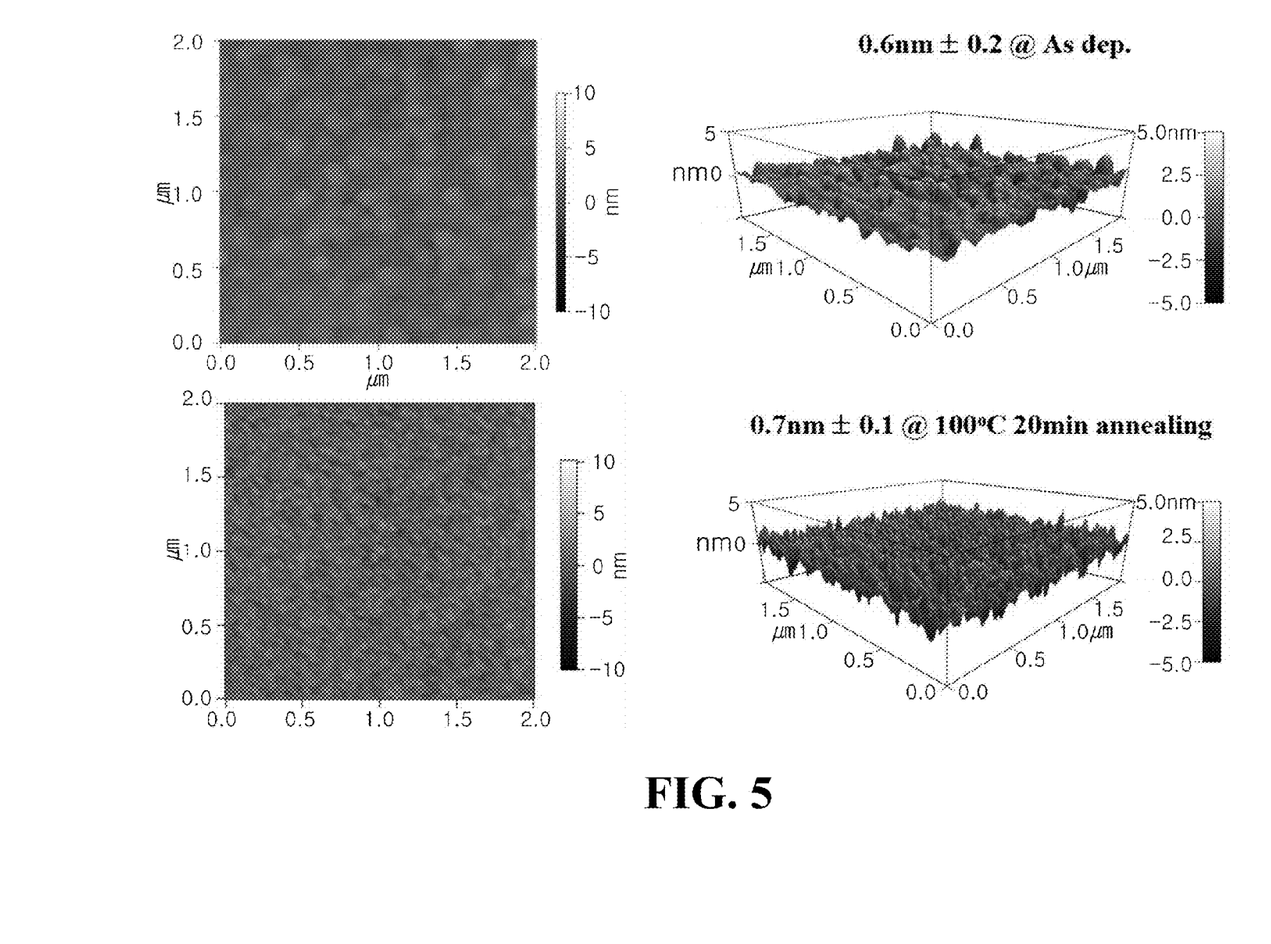
FIG. 5 presents images and graphs showing the change in the surface characteristics of the AZO/Ag/AZO thin film as affected by a heat treatment.

FIG. 5 presents the images and graphs showing the change of the surface characteristics by the heat treatment. If not shown separately, the heat treatment has no effect on the optical transmittance or the electrical conductivity. The top and bottom images of FIG. 5 show the atomic force microscope (AFM) images and the surface toughness values before and after the heat treatment, respectively. The AZO/Ag/AZO multilayer thin film has no significant difference in the surface toughness values before and after the heat treatment, which are 0.6 nm±0.2 and 0.7 nm±0.1, respectively. But, the AFM images show a sharper surface profile of the AZO thin film after the heat treatment.

Figure 6A:
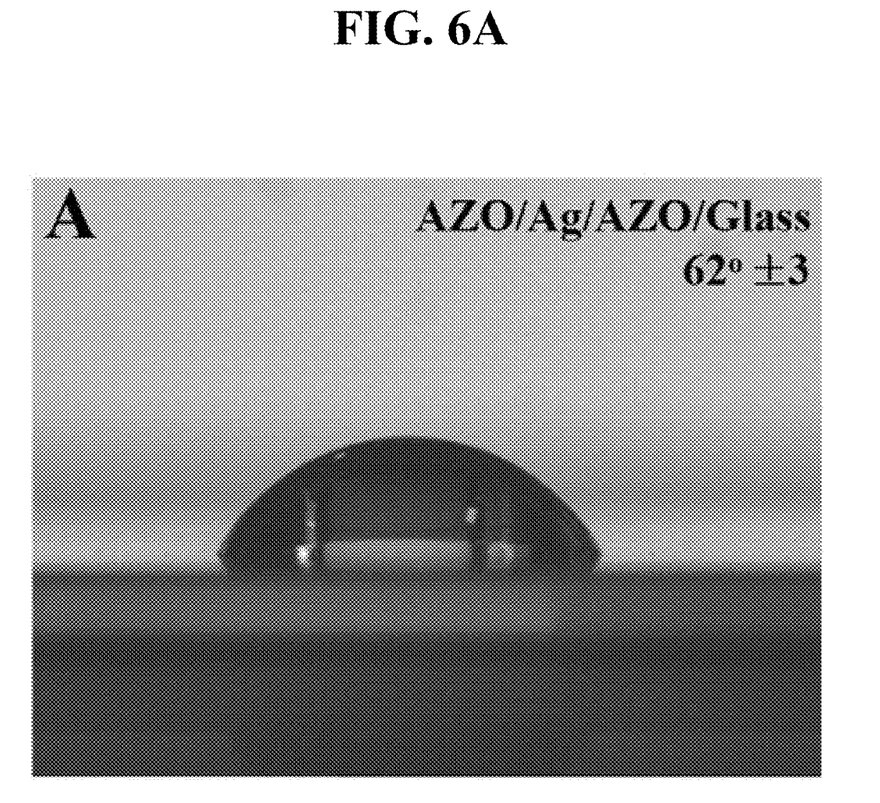
FIGS. 6A and 6B present images showing the angle of contact with water for the AZO/Ag/AZO thin film before and after a heat treatment.
Figure 6B:
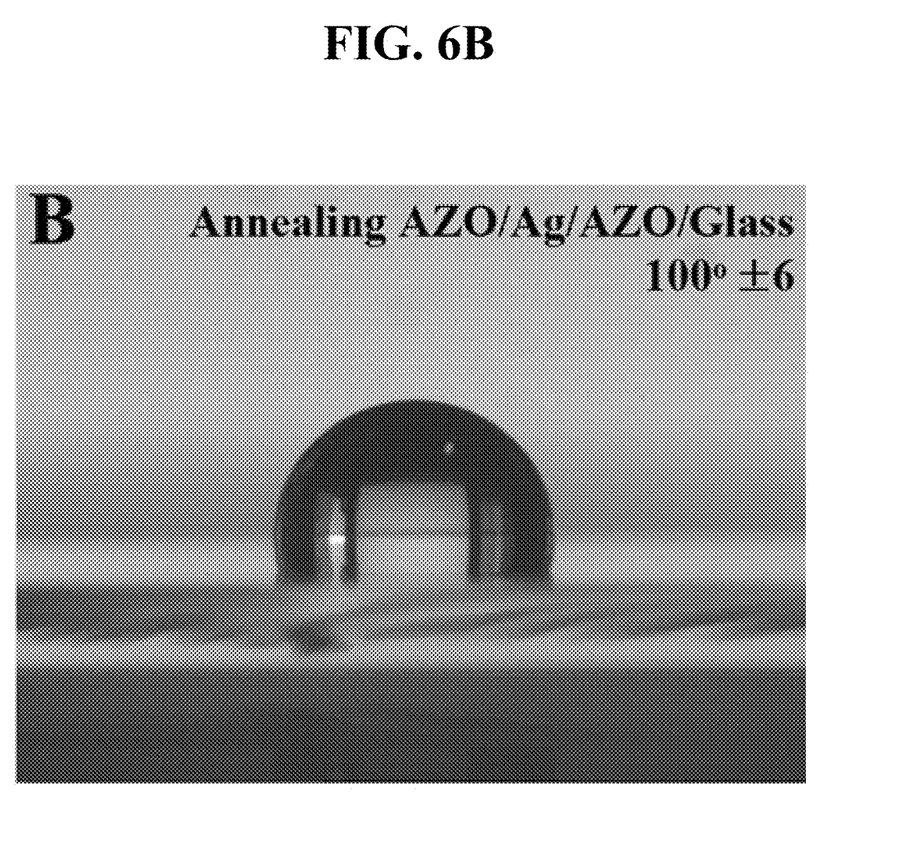

As the change in the AFM surface image caused by the heat treatment appears, a measurement is performed to determine if there is a change in the angle of contact with water. FIG. 5 presents images showing the angle of contact with water before and after the heat treatment. It is shown in FIG. 6 that the angle of contact with water is greatly increased from 62° to 100° due to the heat treatment.

Example 6: Durability Test

Figure 7A:
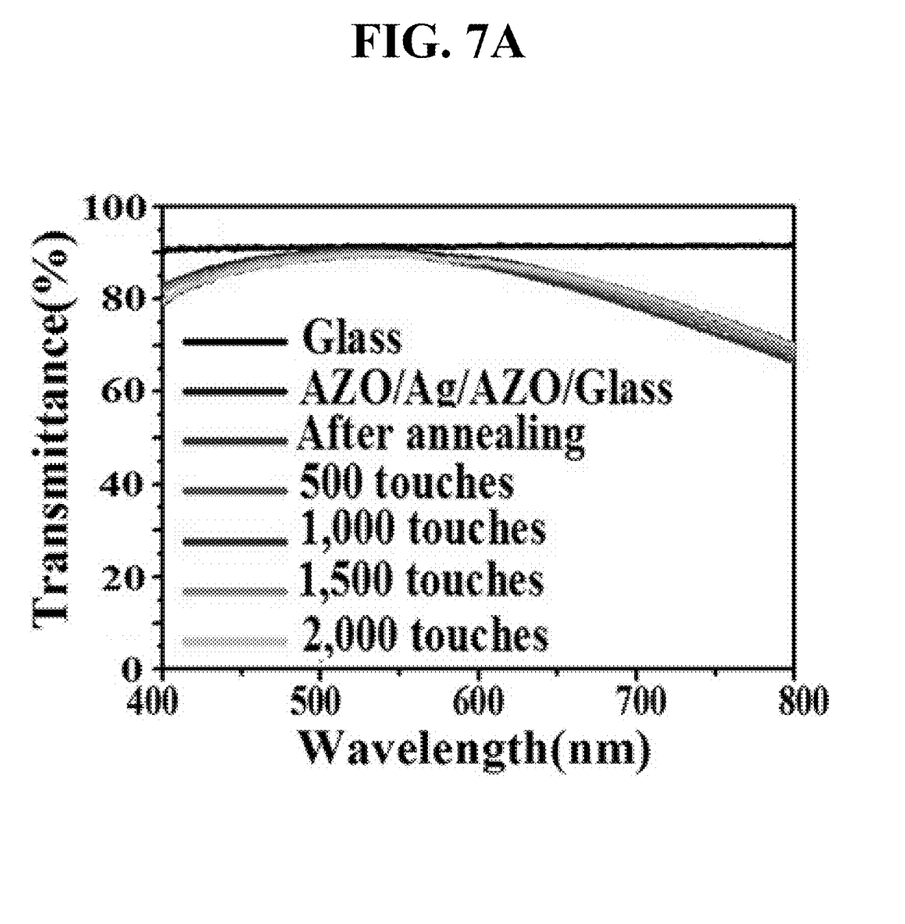
FIGS. 7A, 7B, 8A and 8B present graphs and images showing the durability of the AZO/Ag/AZO thin film.
Figure 7B:
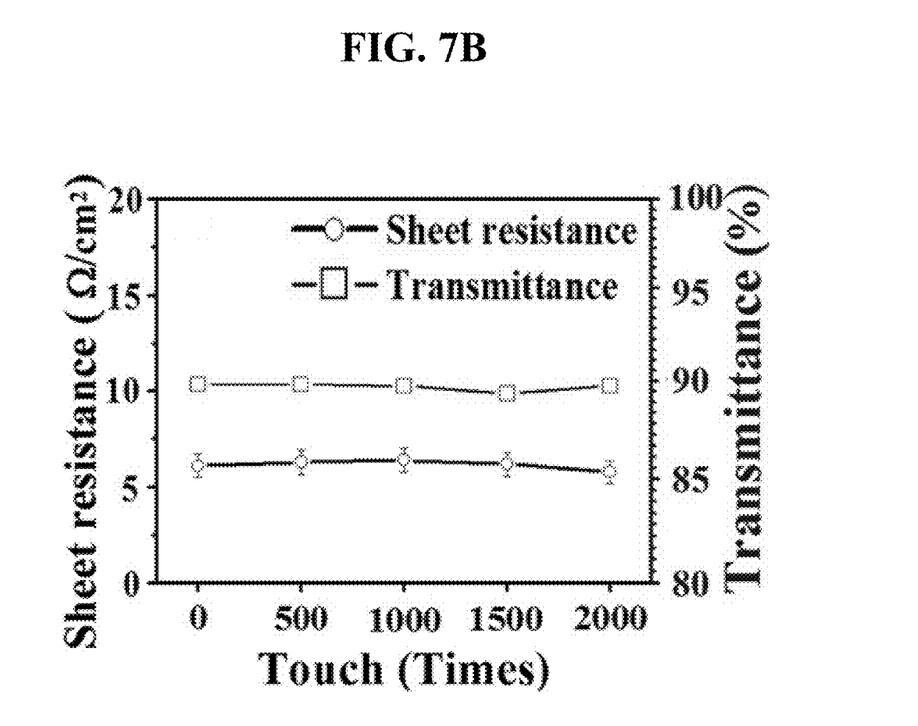
Figure 8A:
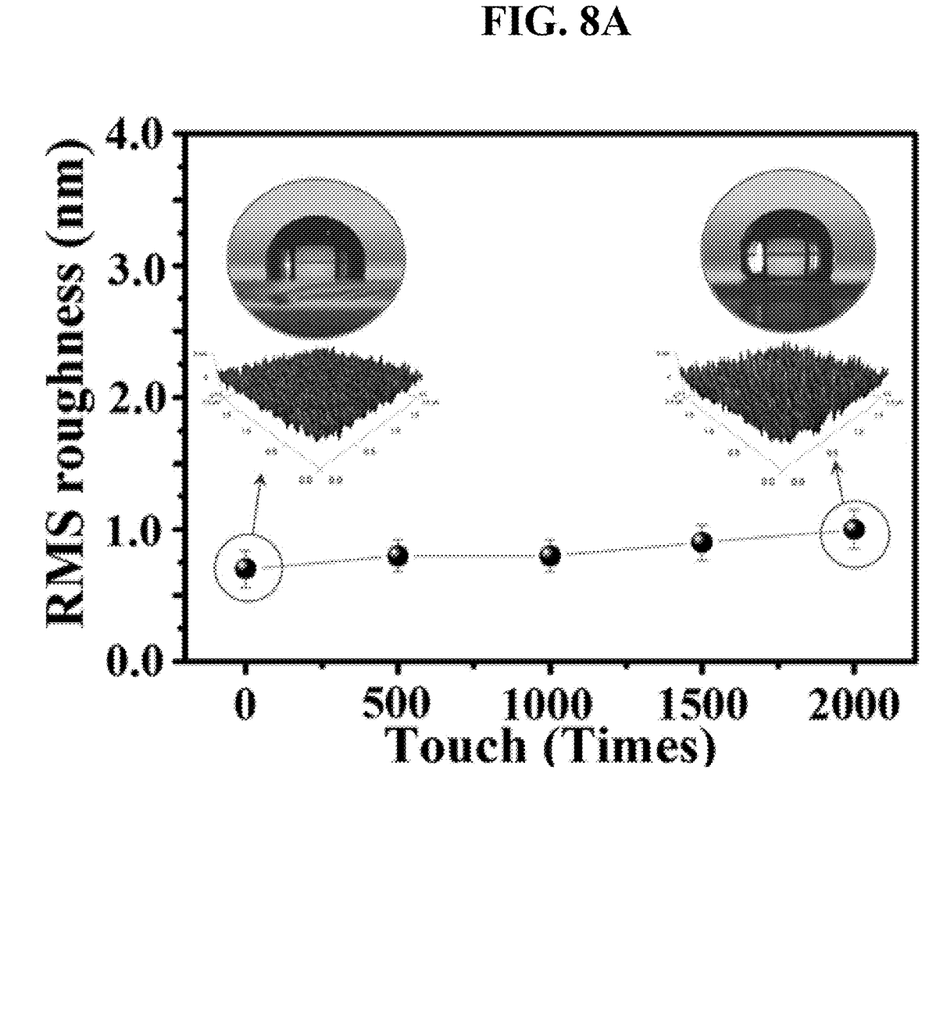
Figure 8B:
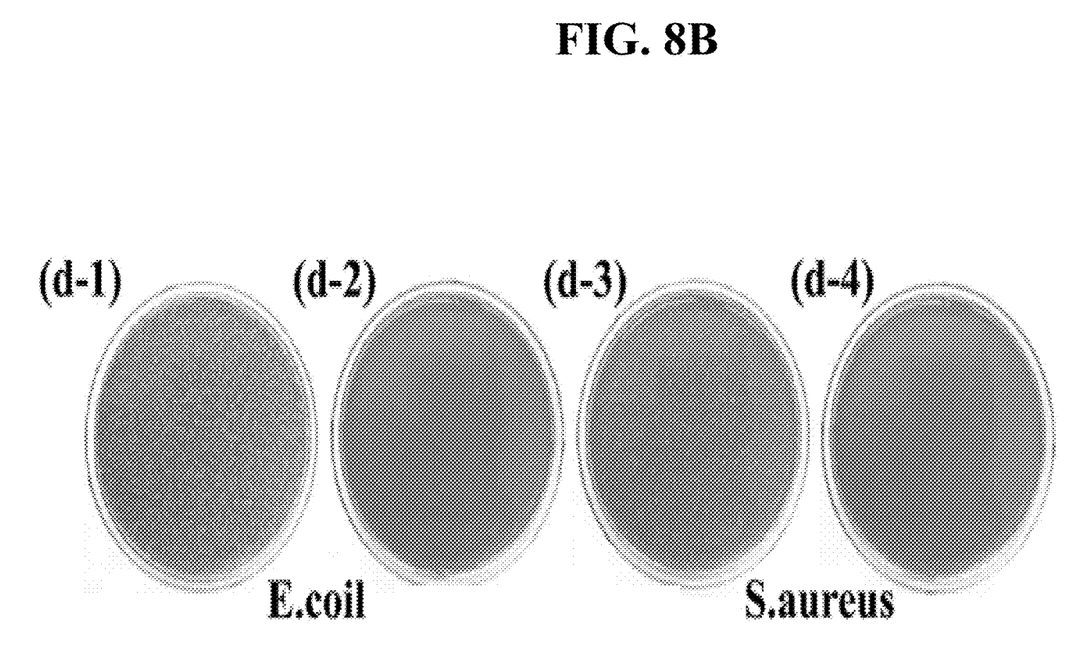

The AZO/Ag/AZO multilayer thin film heat-treated in Example 5 is subjected to a durability test in which at least 2,000 mechanical touches are applied to the AZO/Ag/AZO multilayer thin film. As for the impact conditions of the touch test, the touch intensity is $1.85 \times 10^{-3}$ N·m, which is almost intermediate between the finger touch ($1.1 \times 10^{-3}$ N·m) and the pen touch ($2.5 \times 10^{-3}$ N·m). FIGS. 7A and 7B present the graphs showing the transparency and the sheet resistance after the touch test. It is shown in FIGS. 7A and B that there is no change in the transparency and the sheet resistance even after 2,000 touches. FIG. 7C presents a graph and an image showing the change in the surface toughness and the angle of contact after the touch test, and FIG. 8 presents an image showing the antimicrobial characteristic. It can be seen from these figures that the anti-fingerprint and antimicrobial characteristics are maintained even after 2,000 touches in the touch test.

What is claimed is:

1. An optically transmissive antimicrobial glass having an electromagnetic shielding effect, the antimicrobial glass comprising:
    a glass substrate;
    a first AZO layer deposited on the glass substrate;
    an Ag layer deposited on the first AZO layer; and
    a second AZO layer deposited on the Ag layer,
    wherein the antimicrobial glass is subjected to a heat treatment in an oxygen atmosphere to provide an anti-fingerprint characteristic.

2. The optically transmissive antimicrobial glass of claim 1, wherein thickness of the first AZO layer is 20 to 60 nm and thickness of the second AZO layer is 20 to 60 nm.

3. The optically transmissive antimicrobial glass of claim 1, wherein the Ag layer is 3 to 15 nm in thickness.

4. The optically transmissive antimicrobial glass of claim 1, wherein the heat treatment is performed at 80° C. to 150° C.

5. The optically transmissive antimicrobial glass of claim 1, wherein the antimicrobial glass has a contact angle of higher than 90° with water.

6. An optically transmissive antimicrobial glass having an electromagnetic shielding effect, the antimicrobial glass comprising:
    a glass substrate;
    a first AZO layer deposited on the glass substrate;
    an Ag layer deposited on the first AZO layer; and
    a second AZO layer deposited on the Ag layer,
    wherein the antimicrobial glass is subjected to a heat treatment at 80° C. to 150° C. to provide an anti-fingerprint characteristic.

* * * * *